United States Patent

Nilssen

[11] Patent Number: 6,150,737
[45] Date of Patent: Nov. 21, 2000

[54] AUXILIARY POWER DISTRIBUTION SYSTEM

[76] Inventor: Ole K. Nilssen, Caesar Dr., Barrington, Ill. 60010

[21] Appl. No.: 08/295,150

[22] Filed: Aug. 24, 1994

Related U.S. Application Data

[63] Continuation of application No. 07/401,475, Aug. 29, 1989, abandoned, which is a continuation of application No. 06/709,932, Mar. 8, 1985, abandoned.

[51] Int. Cl.[7] .................................................. H02M 1/00
[52] U.S. Cl. .............................. 307/66; 307/24; 307/28; 200/297; 361/601; 361/641
[58] Field of Search .................... 307/66, 24, 32, 307/28; 320/56, DIG. 36; 315/86; 363/13, 15, 16, 19, 21; 200/297; 361/601

[56] References Cited

U.S. PATENT DOCUMENTS

| | | | |
|---|---|---|---|
| 3,211,914 | 10/1965 | Anderson | 307/73 |
| 3,582,669 | 6/1971 | Dempsey | 307/42 X |
| 3,771,103 | 11/1973 | Attema | 339/21 |
| 3,835,333 | 9/1974 | Balan | 307/64 |
| 4,057,750 | 11/1977 | Elms et al. | 307/27 X |
| 4,140,959 | 2/1979 | Powell | 322/100 |
| 4,241,261 | 12/1980 | Ebert | 307/45 |
| 4,277,728 | 7/1981 | Stevens | 363/37 X |
| 4,315,304 | 2/1982 | Marez et al. | 363/49 |
| 4,323,820 | 4/1982 | Teich | 307/66 X |
| 4,419,588 | 12/1983 | Goiset | 307/18 X |
| 4,494,063 | 1/1985 | Cullen et al. | 320/56 |
| 4,543,624 | 9/1985 | Rumble | 363/146 |

*Primary Examiner*—Albert W. Paladini

[57] ABSTRACT

A power supply is adapted to be powered from an ordinary electric utility power line, or alternately from a standby storage battery, and is operable to provide a power-line-isolated output of 120 Volt RMS at a frequency of about 30 kHz. The Volt-Ampere product available from this power supply is limited to be no more than 100 Volt-Ampere. Due to the high frequency, the electric shock hazard associated with this 120 Volt/30 kHz power supply is not higher than it is for a power supply voltage a voltage of only 30 Volt RMS at 60 Hz.

The power supply is used to provide shock-hazard-free and fire-initiation-hazard-free electric power for an auxiliary power distribution system in a home. Due to the Volt-Ampere limitation and the absence of shock-hazard, the power distribution can safely be done by way of so-called bell wire installation and without requiring the services of a licensed electrician.

Due to the battery back-up feature, this auxiliary power distribution system can provide uninterruptible power to critical loads such as computer terminals, security systems, smoke/fire alarms, safety lighting, etc.

13 Claims, 2 Drawing Sheets

AUXILIARY POWER DISTRIBUTION SYSTEM

This application is a continuation of Ser. No. 07/401,475 filed on Aug. 29, 1989 now abandoned which is a continuation of Ser. No. 06/709,932 filed on Mar. 8, 1985 now abandoned.

BACKGROUND OF THE INVENTION

1. Field of Invention

The present invention relates to an auxiliary power distribution system operable to provide uninterruptible power to various critical loads and/or power outlets.

2. Background and Prior Art

Class-2 electrical circuits have long been used as the basis for auxiliary power distribution systems in private, public and commercial buildings, their main applications being limited to powering door chimes, thermostats, etc. However, these Class-2 circuits are normally powered from a regular electric utility power line, without any source of back-up power, and are therefore subject to occasional power interruptions. Thus, this type of Class-2 auxiliary power distribution system is not effective in providing power to loads that should not suffer power interruptions—loads such as computer terminals, emergency lighting, telephone terminals, PBX systems, smoke/fire alarms, intrusions alarms, etc.

According to Article 725 of NATIONAL ELECTRICAL CODE 1984—issued by NATIONAL FIRE PROTECTION ASSOCIATION, BATTERYMARCH PARK, Quincy, Mass. 02269—as long as output current may exceed 0.005 Amp, a Class-2 electrical circuit is limited to a maximum output voltage of 30 Volt RMS for sinusoidal voltages at power line frequencies. Based on experience, this voltage level is considered to be acceptably safe from electric shock hazards.

A wide variety of Class-2 transformers and power supplies are available for purchase. An example of a Class-2 transformer is a so-called bell-transformer, as typically used for powering a door chime or a thermostat. An example of a Class-2 power supply is a plug-in battery eliminator for a hand-held calculator.

At frequencies substantially higher than 60 Hz, the human body exhibits a significant degree of so-called skin-effect; which causes less penetration of current into the human body while at the same time making the human body more resistive to the flow of current.

For instance, at a frequency of 60 Hz, it is relatively harmless for a person to receive an electric shock that results in a current as high as 0.005 Amp. At 30 kHz, on the other hand, it is about equally harmless for a person to receive an electric shock that results in a current as high as 0.03 Ampere.

SUMMARY OF THE INVENTION

Objects of the Invention

One object of the present invention is that of providing an auxiliary power distribution system adapted to provide uninterrupted power to loads and/or power outlets that should not suffer from power interruption.

Another object is that of providing for a distribution system for uninterruptible electric power and wherein said power is distributed in a way that is fire-initiation-hazard-free and/or shock-hazard-free.

This as well as other important objects and advantages of the present invention will become apparent from the following description.

BRIEF DESCRIPTION

In its preferred embodiment, subject invention comprises a frequency-converting power supply normally powered from an ordinary electric utility power line, but from a stand-by storage battery during periods of power failure. Comprised within this power supply is a full bridge rectifier, a 30 kHz inverter, an isolating voltage transformer, and a current-limiting means. The power-line-isolated current-limited 30 kHz output voltage from this frequency-converting power supply is provided to a bell-wire-type power distribution network by which it is distributed to various loads throughout a building.

The RMS magnitude of the 30 kHz output voltage is about 120 Volt. Because the frequency is so much higher than 60 Hz, the electric shock hazard associated with the 120 Volt/30 kHz output is no worse than that associated with a regular Class-2 30 Volt/60 Hz output. Consequently, since the output is also current-limited such that no more than 100 Volt-Ampere can be provided, the output from the power supply may be considered free of both electric shock hazard and fire-initiation hazard, thereby providing all the safety features normally associated with Class-2 electrical circuits.

DESCRIPTION OF THE PREFERRED EMBODIMENT

Details of Construction

Figure 1:
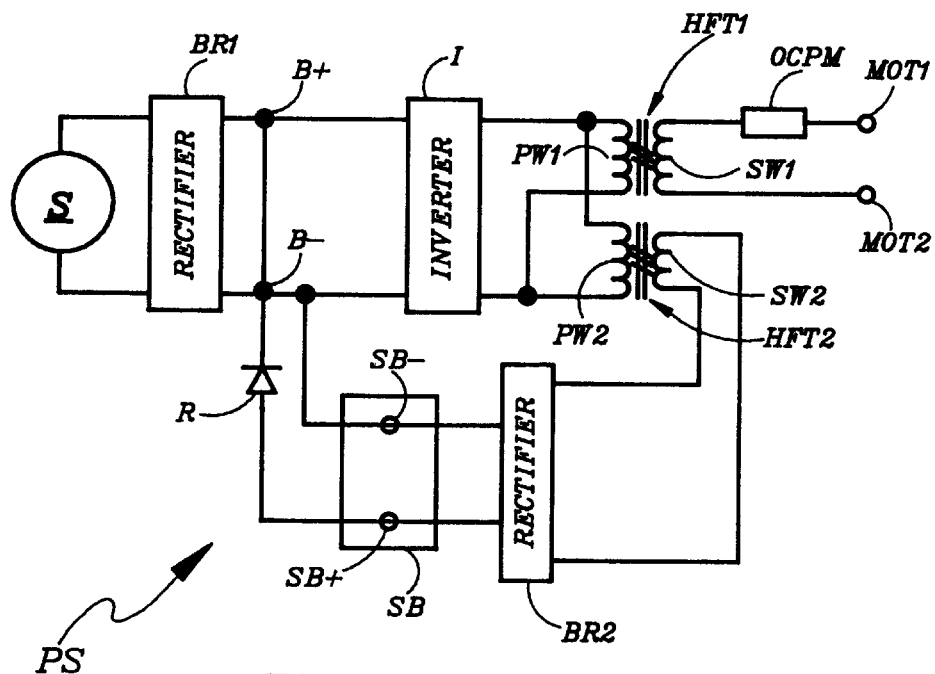
FIG. 1 provides a schematic circuit diagram of the preferred embodiment of the frequency-converting power supply with its back-up storage battery.

In FIG. 1, a source S of 120 Volt/60 Hz power is applied to a first bridge rectifier BR1, the DC output voltage of which is applied to a B+ terminal and a B− terminal—with the B+ terminal being of positive polarity with respect to the B− terminal.

An inverter I is connected with and powered from the B+ and B− terminals; and the output of the inverter—which is substantially a non-power-limited squarewave voltage of 30 kHz frequency—is applied to the primary winding PW1 of a first high-frequency transformer HFT1. Transformer HFT1 has a secondary winding SW1 connected with main output terminals MOT1 and MOT2 by way of over-current protection means OCPM.

The inverter output is also connected with the primary winding PW2 of a second high-frequency transformer HFT2; which second transformer has a secondary winding SW2 connected with a second bridge rectifier BR2, the output of which is applied to the terminals SB+ and SB− of a storage battery SB—terminal SB+ being of positive polarity with respect to terminal SB−. The SB− terminal is directly connected with the B− terminal. The SB+ terminal is connected with the anode of a rectifier R—with the B+ terminal being connected with the cathode of rectifier R.

The overall power supply of FIG. 1 is referred to as PS.

Figure 2:
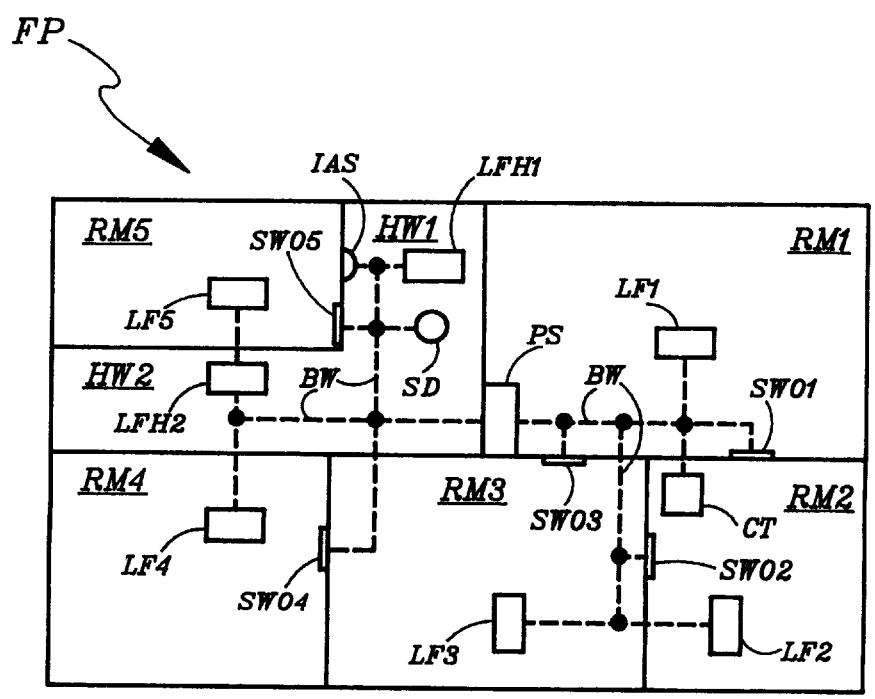
FIG. 2 illustrates the preferred embodiment of the overall auxiliary power distribution system.

FIG. 2 illustrates how the power supply of FIG. 1 is used in the invention. More specifically, FIG. 2 shows a floor plan FP of a building having rooms RM1, RM2, RM3, RM4 and RM5, as well as a first hallway HW1 and a second hallway HW2. Power supply PS is mounted in RM1, typically within the wall or in a cabinet near the center of the building and permanently connected with the regular electric utility power line. A pair of bell-wire-type distribution wires BW is connected with main output terminals MOT1 and MOT2 of power supply PS, and these wires are routed from PS to the following different points within the building: to a smoke detector SD in the ceiling of HW1; to low-power lighting fixtures LFH1 and LFH2 in hallways HW1 and HW2, respectively; to lighting fixtures LF1, LF2, LF3, LF4, and LF5 in rooms RM1, RM2, RM3, RM4, and RM5, respectively; to special wall outlets SWO1, SWO2, SWO3, SW4 and SW5 in rooms RM1, RM2, RM3, RM4 and RM5, respectively; to computer terminal CT in RM2; and to intrusion alarm system IAS in hallway HW1.

Figure 3:
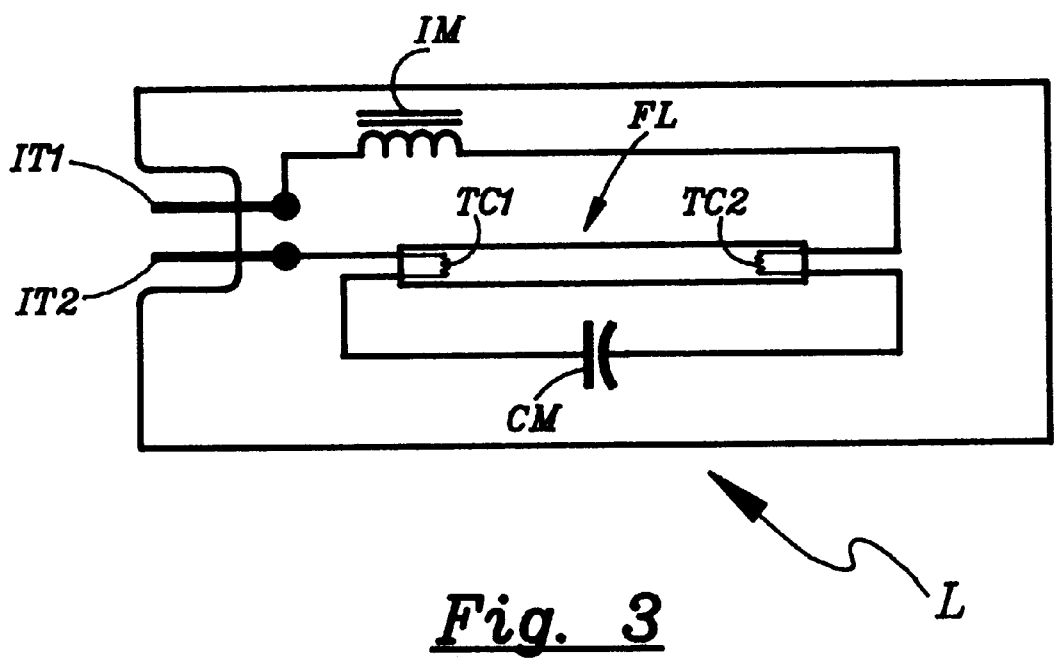
FIG. 3 illustrates an operating circuit for powering a fluorescent lamp directly from the 120 Volt/30 kHz voltage provided by the auxiliary power distribution system.

FIG. 3 shows a luminaire L operable to connect with the pair of distribution wires BW at input terminals IT1 and IT2. This luminaire comprises an ordinary fluorescent lamp FL, which has thermionic cathodes TC1 and TC2. An inductor means IM is connected in series with a capacitor means CM by way of the two thermionic cathodes; and the resulting series-combination is connected directly across input terminals IT1 and IT2.

Details of Operation

With the power supply of FIG. 1 connected with an ordinary 120 Volt/60 Hz electric utility power line, the first rectifier BR1 means provides a substantially constant-magnitude DC voltage to the inverter; which then provides a 30 kHz non-current-limited non-amplitude-modulated squarewave voltage to the primary windings PW1 and PW2 of transformers HFT1 and HFT2, respectively.

The SW1 secondary windings provides to the MOT1 and MOT2 terminals a 30 kHz squarewave voltage of RMS magnitude approximately equal to 120 Volt. To meet with the requirements of the National Electrical Code for Class-2 and/or Class-3 circuits, the maximum current available from this secondary winding must be limited in such a way that the maximum Volt-Ampere product extractable from terminals MOT1 and MOT2 is no more than 250 Volt-Ampere— regardless of the current-limiting capabilities of the over-current protection means OCPM.

This degree of power limitation is provided for by magnetic flux leakage in transformer HFT; which is so designed as not to be capable of providing a short circuit current of more than about 6 Ampere RMS. (As an alternative to flux leakage, this or any other suitable degree of current-limitation may readily be provided by way of adding an inductor in series with one of the output terminals of secondary winding SW1.)

The power from secondary winding SW1 is provided to the main output terminals MOT1 and MOT2 by way of another and much more sensitive current-limiting means, namely over-current protection means OCPM. This over-current protection means is a thermally responsive bimetallic circuit breaker; which circuit breaker is actuated by heat generated by the current flowing through the circuit breaker. So as to meet with the requirements of the National Electrical Code, this circuit breaker has been made such as to break the circuit at a current flow of about 0.8 Ampere RMS.

The second transformer HFT2 is used for providing charging power to storage battery SB, the voltage across which is smaller in magnitude than is the magnitude of the substantially constant-magnitude DC voltage between the B+ terminal and the B− terminal when 120 Volt/60 Hz power is provided to first rectifier BR1. However, if the 120 Volt/60 Hz power is removed, as during a power failure, the DC voltage provided by the first rectifier disappears, and the DC voltage now supplied to the inverter will be that of the storage battery. With the inverter supplied with a smaller-magnitude DC voltage, the magnitude of the 30 kHz voltage presented to second rectifier BR2 will be reduced enough so that no charging of the storage battery now takes place.

Thus, during power failure, the 30 kHz voltage provided across the MOT1 and MOT2 terminals will have a somewhat reduced magnitude; which reduced-magnitude voltage will be provided for as long as there is charge left in the storage battery. It is noted, however, that the degree by which the magnitude is reduced is not so large as to cause problems in respect to the proper operation of the various loads connected with the auxiliary power distribution system.

The fire-initiation-hazard-free and shock-hazard-free 120 Volt/30 kHz voltage from main output terminals MOT1 and MOT2 is connected with the bell-wire-type distribution wires BW and distributed throughout the building as indicated. Being effectively as safe as a regular Class-2 electrical circuit, the wiring may safely be placed within walls, under carpets, etc. In particular, the distribution wires BW may be installed in the same manner as is used for installing telephone wires.

Because the power distribution is effected by way of the relatively high-magnitude voltage of 120 Volt RMS, as contrasted with the maximum permissible 30 Volt RMS of present Class-2 circuits, the voltage-drops associated with a fairly extensive power distribution network is relatively modest—having, for a given wire gage, only about 6% of the significance as compared with a 30 Volt level.

Moreover, because the RMS voltage-magnitude is chosen to be 120 Volt, it is possible to power a number of ordinary 120 Volt loads—such as 120 Volt incandescent light bulbs—directly from the distribution wires BW.

As indicated by the special wall outlets (SWO1 to SWO5 in rooms RM1 to RM5), provisions have been made for providing special outlets or receptacles in various rooms by which loads adapted to properly operate on a 120 Volt/30 kHz AC voltage may be plugged in and properly powered.

By making the power supply of FIG. 1 a non-power-limited source of 120 Volt/30 kHz AC voltage, and by distributing this 120 Volt/30 kHz non-power-limited AC voltage by means similar to what is presently being used for distributing regular 120 Volt/60 Hz non-power-limited AC voltage, it is possible to provide for a non-power-limited but effectively shock-hazard-free auxiliary power supply system for a building. However, to mitigate excessive distribution losses that may result from so-called skin-effect, it would in this case be advantageous to use litz-wire for the wires in the distribution system.

Applicant has verified by actual tests that a current flow through the human body of over 0.03 Amp at a frequency of about 30 kHz can not reasonably be regarded as an electric shock, and especially not as a dangerous electric shock. In this connection, it is noted that Underwriters Laboratories prescribes the use of a 500 Ohm resistor to simulate the overall resistance of a human body when exposed to a voltage of 60 Hz frequency. This implies that, at a voltage of 120 Volt, the resulting current would be 0.240 Amp; which is higher than the previously defined safe limit of 0.03

Amp at 30 kHz. However, it should be recognized that at 30 kHz the equivalent resistance of the human body would be higher than it is at 60 Hz.

Applicant has also verified to his own satisfaction that by directly touching a pair of bare wires carrying 120 Volt RMS at a frequency of 30 kHz does not give rise to a significant electric shock.

In the power supply of FIG. 1, first bridge rectifier BR1 comprises a filter capacitor means, whereby the resulting DC voltage is substantially free of ripple. Also, it is noted that inverter I is of conventional construction, whereby the 30 kHz voltage provided at its output has an instantaneous magnitude that is substantially a fixed proportion of that of the DC voltage applied to the inverter. That is, there is substantially no dissipation taking place within the inverter; which implies that the voltage and current limitation associated with the power supply's output is accomplished in a substantially non-dissipative fashion, a feature that is in contrast with ordinary Class-2 power supplies.

While the power supply of FIG. 1 is arranged to provide a squarewave voltage at its output, it is readily possible by well known means to provide instead for a sinusoidal output voltage, something that may be advantageous from the viewpoint of electromagnetic interference.

Also, while maintaining a high degree of protection against electric shock hazards, it is possible to use a frequency for the inverter output voltage that is substantially lower than 30 kHz.

It is noted that many loads designed to be powered from a 120 Volt/60 Hz voltage may just as well be powered from a 120 Volt/30 kHz voltage—directly, without requiring any voltage conditioning. Such loads include incandescent lamps and most other resistive loads. Other loads, such as many existing computer-type terminals and TV sets, can not operate directly on 120 Volt/30 kHz voltage; but can operate on DC voltage of about 150 Volt magnitude. Such DC voltage can readily be obtained from 120 Volt/30 kHz voltage by way of a simple full-wave rectifying means; which rectifying means would then be interposed between an outlet providing 120 Volt/30 kHz and the power plug of a load operable on 150 Volt DC.

By proper initial design, however, it is not difficult in most cases to permit a load to operate equally effectively on 120 Volt/30 kHz as on 120 Volt/60 Hz.

It is to be understood that the auxiliary power distribution system of FIG. 2 is not intended to substitute for the regular 120 Volt/60 Hz system. Rather, it is intended to be used only for such loads where the particular features of the system have significant value. Although not explicitly shown, a 120 Volt/60 Hz power distribution system is implicitly assumed to be present in the diagram of FIG. 2.

Moreover, for a given building, more than one auxiliary power distribution system might be needed; and each one of these would expectedly be connected with and would derive primary power from the regular 120 Volt/60 Hz power line.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

What is claimed is:

1. An arrangement comprising:
    a building having plural rooms and a main power distribution system whereby ordinary power line voltage from an ordinary electric utility power line is provided by way of a first set of power distribution wires to a first type of electrical load and/or power outlet located in each of at least two of the rooms; said power line voltage suffering from occasional periods of interruption; and
    auxiliary power distribution system having an auxiliary source of power and providing an auxiliary voltage by way of a second set of power distribution wires to a second type of electrical load and/or power outlet located in each of at least two of the rooms; the auxiliary voltage being provided during said periods of interruption as well as during other times; the second type of electrical load and/or outlet being different from the first type of electrical load and/or outlet; the auxiliary power distribution system is further characterized by including: (i) a power supply having a pair of output terminals operative to supply a Volt-Ampere output; (ii) the Volt-Ampere output extractable from the output terminals being manifestly prevented by a first current-limiting means from exceeding a first pre-determined level; and (iii) the magnitude of any current drawn from the output terminals being limited by a second current-limiting means from exceeding a second predetermined level; the second pre-determined level being different from the first pre-determined level.

2. An arrangement comprising:
    In a building having rooms and a main power supply system operative to distribute power line voltage from an ordinary electric utility power line to an ordinary household electrical outlet in each room; the power line voltage suffering from occasional periods of interruption; the improvement comprising:
    an auxiliary power supply system having an auxiliary source of power operative to distribute an auxiliary voltage to a special power outlet in each room; each power outlet being operative to receive and disconnectably hold a special power plug; the maximum amount of power extractable from any one of the special power outlets being limited so as to be safe from fire initiation hazard; the auxiliary power supply system being further characterized by providing the auxiliary voltage during said periods of interruption as well as during other periods.

3. The arrangement of claim 2 wherein the auxiliary power supply system is additionally characterized in that the RMS magnitude of the auxiliary voltage is substantially equal to that of the power line voltage.

4. The arrangement of claim 2 wherein the auxiliary power supply system is additionally characterized in that the auxiliary source of power is represented by a single central inverter means connected in circuit with a storage battery as well as with the power line voltage.

5. The arrangement of claim 2 wherein the arrangement is additionally characterized in that: (i) the main power distribution system includes electrical conductors operative to safely distribute electric power of magnitude substantially higher than what would ordinarily be considered as being safe from fire-initiation hazard; whereas (ii) the auxiliary power distribution system includes electrical conductors not operative to safely distribute electric power of magnitude higher than what would ordinarily considered as being safe from fire-initiation hazard.

6. The arrangement of claim 2 wherein the arrangement is additionally characterized in that: (i) the main power distribution system distributes the power line voltage by way of ordinary power line voltage distribution conductors; and (ii)

the auxiliary power distribution system distributes the auxiliary voltage by way of bell-wire-type conductors.

7. The arrangement of claim 2 wherein the auxiliary power supply system is additionally characterized in that the auxiliary source of power includes a central inverter circuit connected with the power line voltage; the central inverter circuit: (i) being operative to provide an AC inverter output voltage at a pair of inverter output terminals; and (ii) including a storage battery charged by power drawn from the inverter output terminals.

8. The arrangement of claim 2 wherein the auxiliary power supply system is additionally characterized in that the auxiliary source of power includes an inverter circuit characterized by: (i) having a pair of DC terminals across which exists a DC supply voltage of substantially constant magnitude; and (ii) providing a squarewave inverter output voltage across a pair of inverter output terminals.

9. An arrangement comprising:

In a building having a main power supply system operative to distribute power line voltage from an ordinary electric utility power line to an ordinary household electrical outlet in each of plural rooms in the building; the power line voltage suffering from occasional periods of interruption; the improvement comprising:

an auxiliary power supply system having an auxiliary source of power operative to distribute an auxiliary voltage to a special power outlet in each of several rooms in the building; each power outlet being operative to receive and hold a special power plug; the maximum amount of power extractable from any one of the special power outlets being limited so as to be safe from fire initiation hazard; the auxiliary power supply system being further characterized by providing the auxiliary voltage during said periods of interruption as well as during other periods.

10. The arrangement of claim 9 wherein the auxiliary power supply system is additionally characterized in that it distributes the auxiliary voltage to a lighting means in each of at least two of the several rooms.

11. An arrangement comprising:

In a building having a main power supply system operative to distribute power line voltage from an ordinary electric utility power line to an ordinary household electrical outlet in each of several rooms in the building; the improvement comprising:

an auxiliary power supply system having an auxiliary source of power operative to distribute an auxiliary voltage to a special load in each of at least two of the several rooms; the maximum amount of power available to each of the special loads being limited to a level that is safe from fire initiation hazard; the special loads including a lighting means in each of at least two of the several rooms; each lighting means being operable to produce a substantive amount of light.

12. The arrangement of claim 11 wherein the auxiliary power supply system is additionally characterized in that at least one of the special loads is not operable to produce a substantive amount of light.

13. The arrangement of claim 11 wherein at least one of the special loads is a smoke detector.

* * * * *